(12) United States Patent
Kato

(10) Patent No.: US 9,855,941 B2
(45) Date of Patent: Jan. 2, 2018

(54) AUTOMATIC STOP AND START CONTROL SYSTEM FOR AN INTERNAL COMBUSTION ENGINE

(71) Applicant: TOYOTA JIDOSHA KABUSHIKI KAISHA, Toyota-shi, Aichi-ken (JP)

(72) Inventor: Hirokazu Kato, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/038,072

(22) PCT Filed: Nov. 19, 2014

(86) PCT No.: PCT/IB2014/002484
§ 371 (c)(1),
(2) Date: May 20, 2016

(87) PCT Pub. No.: WO2015/075526
PCT Pub. Date: May 28, 2015

(65) Prior Publication Data
US 2016/0297415 A1 Oct. 13, 2016

(30) Foreign Application Priority Data

Nov. 21, 2013 (JP) .................................. 2013-241191

(51) Int. Cl.
| | | |
|---|---|---|
| *B60W 30/18* | (2012.01) | |
| *F02D 41/04* | (2006.01) | |
| *F02D 41/06* | (2006.01) | |
| *B60W 10/18* | (2012.01) | |
| *B60W 10/188* | (2012.01) | |
| *B60W 10/06* | (2006.01) | |
| *F02N 11/08* | (2006.01) | |
| *B60W 10/184* | (2012.01) | |

(52) U.S. Cl.
CPC .......... *B60W 10/06* (2013.01); *B60W 10/182* (2013.01); *B60W 10/184* (2013.01);
(Continued)

(58) Field of Classification Search
CPC .. B60W 10/06; B60W 10/182; B60W 10/188; B60W 30/18018; B60W 30/18109; F02D 41/042; F02D 41/065
See application file for complete search history.

(56) References Cited

U.S. PATENT DOCUMENTS

| | | |
|---|---|---|
| 6,135,920 A | 10/2000 | Kamiya et al. |
| 7,734,403 B2 | 6/2010 | Baijens et al. |

(Continued)

FOREIGN PATENT DOCUMENTS

| | | |
|---|---|---|
| DE | 19502154 A1 | 8/1996 |
| DE | 102005009929 A1 | 9/2006 |

(Continued)

*Primary Examiner* — Redhwan K Mawari
*Assistant Examiner* — Rodney P King
(74) *Attorney, Agent, or Firm* — Oliff PLC

(57) ABSTRACT

A control apparatus for a vehicle includes: a stop-restart unit that stops an engine if an engine stop condition is satisfied and restarts the engine if a restart condition is satisfied; a first braking force control unit and a second braking force control unit that maintain a braking force for stopping the vehicle; and an engine start unit that starts the engine in the case where a vehicle stop state achieved by the first braking force control unit is switched to a vehicle stop state achieved by the second braking force control unit while the engine is stopped by the stop-restart unit.

7 Claims, 15 Drawing Sheets

(52) U.S. Cl.
CPC .... *B60W 10/188* (2013.01); *B60W 30/18018* (2013.01); *B60W 30/18109* (2013.01); *B60W 30/18118* (2013.01); *F02D 41/042* (2013.01); *F02D 41/065* (2013.01); *F02N 11/0822* (2013.01); *F02N 11/0833* (2013.01); *F02N 2200/0803* (2013.01); *F02N 2200/102* (2013.01); *Y02T 10/48* (2013.01)

(56) References Cited

U.S. PATENT DOCUMENTS

| | | |
|---|---|---|
| 7,890,243 B2 | 2/2011 | Abendroth |
| 2002/0086772 A1* | 7/2002 | Abe ..................... B60T 7/122 477/102 |
| 2007/0200424 A1* | 8/2007 | Sakai .................... B60K 6/547 303/3 |
| 2007/0215577 A1 | 9/2007 | Park |
| 2008/0133103 A1 | 6/2008 | Meske et al. |
| 2011/0169323 A1 | 7/2011 | Tseng et al. |

FOREIGN PATENT DOCUMENTS

| | | |
|---|---|---|
| DE | 102007012123 A1 | 10/2007 |
| DE | 102007061940 A1 | 11/2008 |
| DE | 102008001691 A1 | 11/2009 |
| JP | 2000-008905 A | 1/2000 |
| JP | 2012-011969 A | 1/2012 |

\* cited by examiner

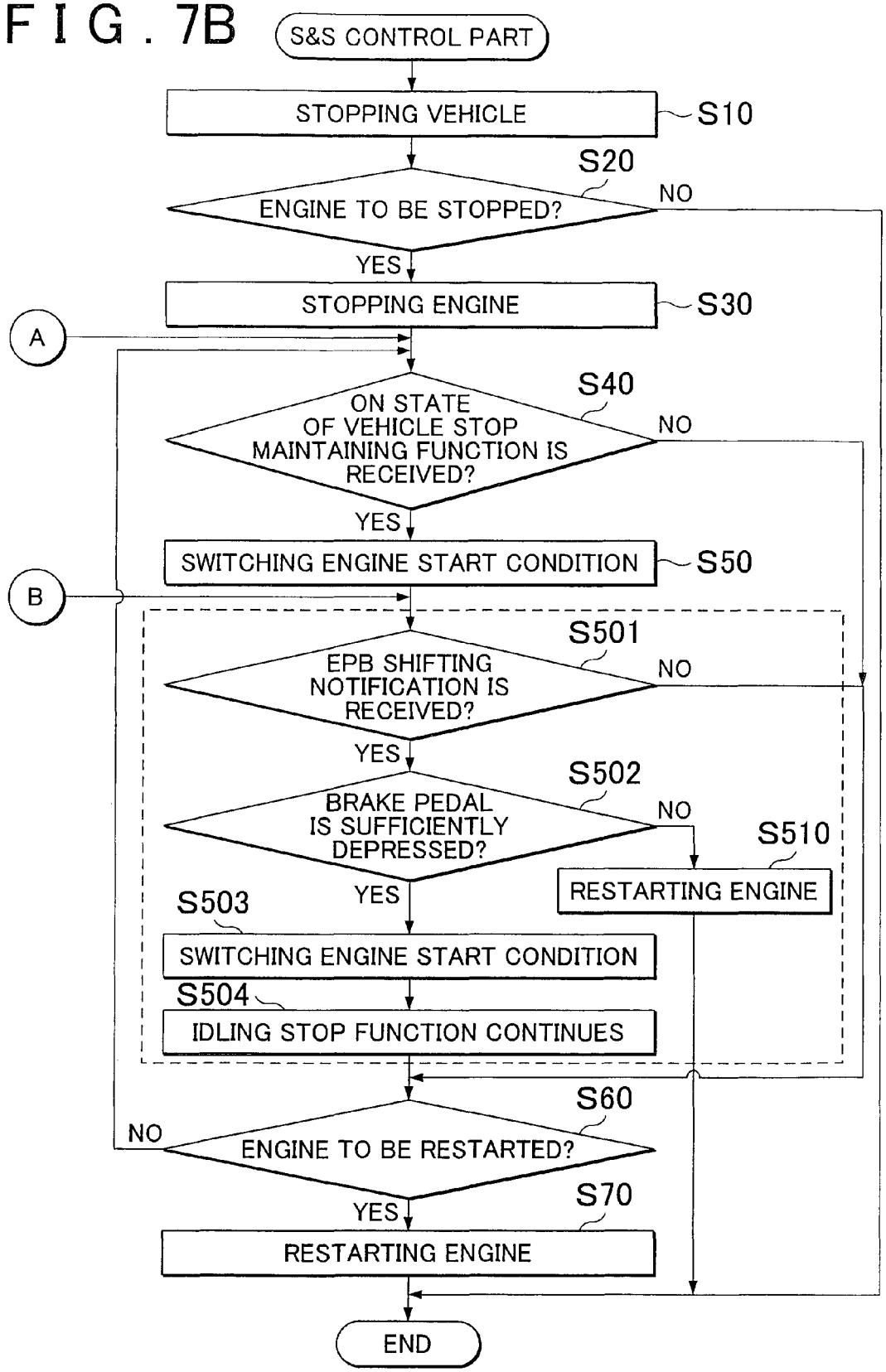

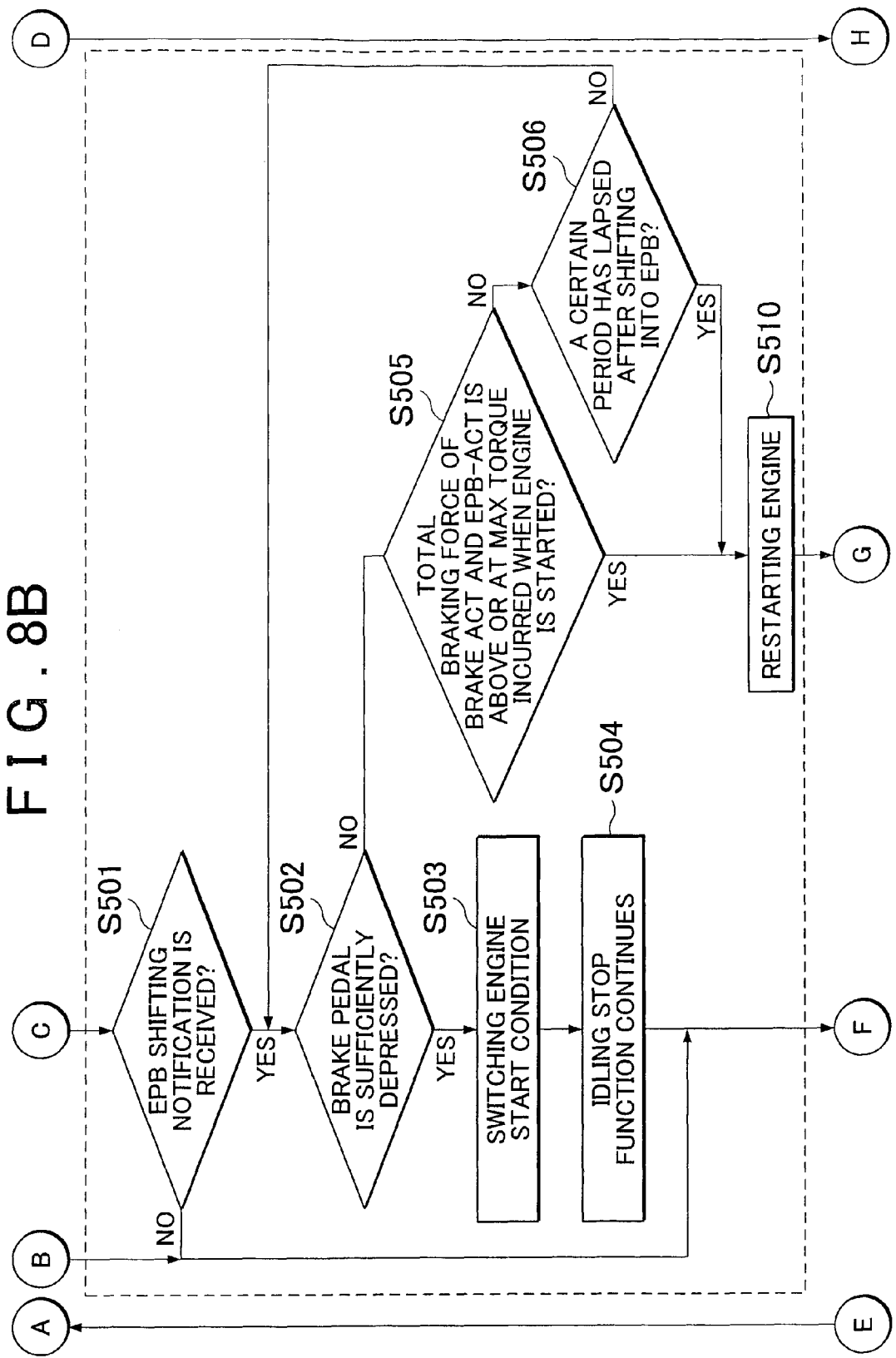

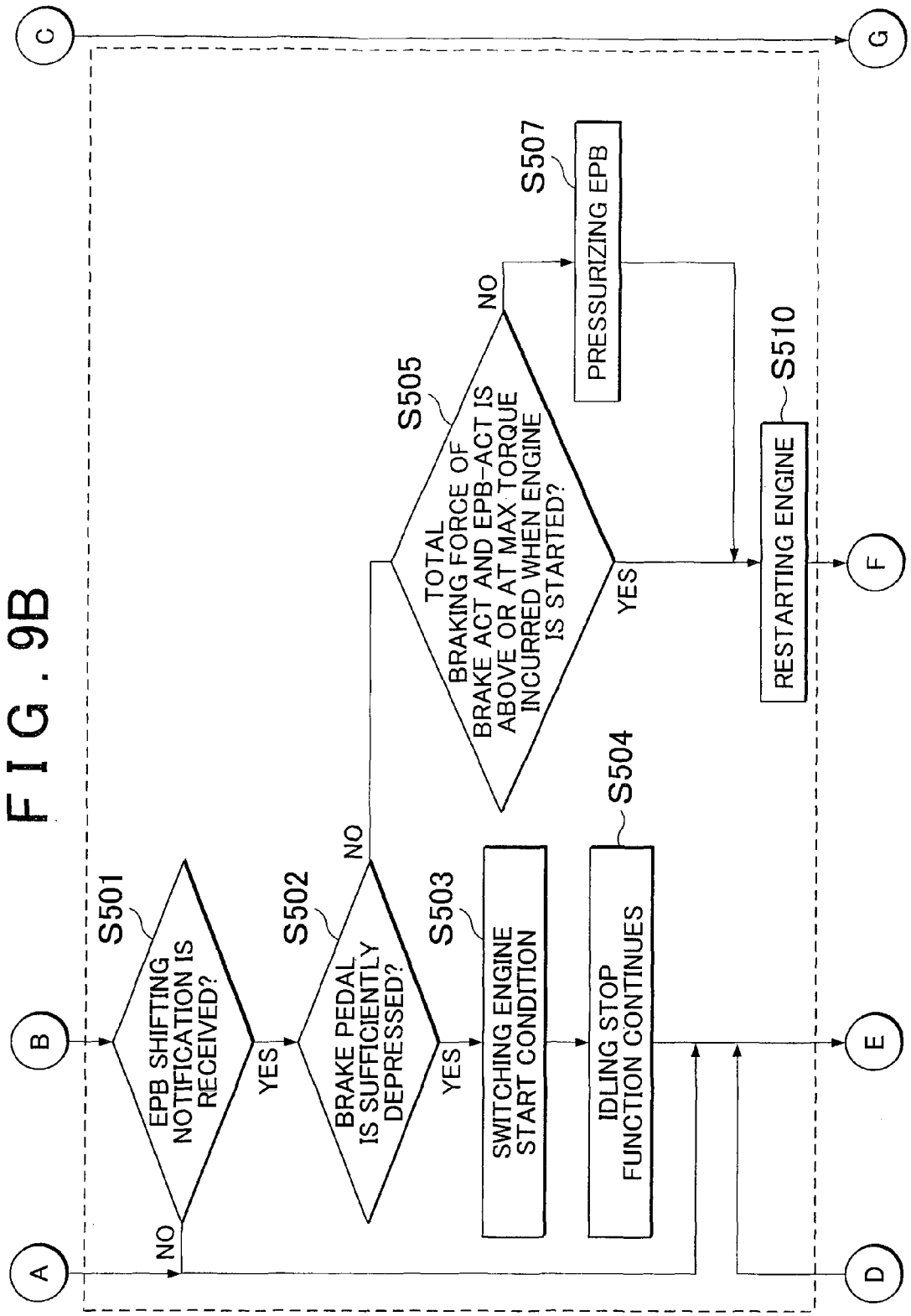

AUTOMATIC STOP AND START CONTROL SYSTEM FOR AN INTERNAL COMBUSTION ENGINE

BACKGROUND OF THE INVENTION

1. Field of the Invention

The present invention relates to a control apparatus for a vehicle having an idling stop function and a vehicle stop maintaining function.

2. Description of Related Art

An idling stop technology in which an engine is stopped while a vehicle is stopped by a driver's operation on a brake pedal is known. Also, a technology in which the engine that has been stopped by the idling stop technology is restarted when the driver's foot is moved away from the brake pedal is known. The both technologies are collectively called idling stop function, start & stop function, engine-automatically-start-stop function, or the like (hereinafter, simply referred to as "idling stop function").

In addition, there is also a technology in which the braked state of the vehicle is maintained even though the driver has moved his foot away from the brake pedal while the vehicle is being stopped, which technology is referred to as braking maintenance function and/or hill-start assistance (hereinafter, simply referred to as "vehicle stop maintaining function"), or the like. With this technology, when the vehicle is stopped before a traffic light, the driver does not need to depress the brake pedal, so the driver's fatigue may be alleviated.

In a vehicle in which the idling stop function and the vehicle stop maintaining function are both operatable, after the engine is stopped by the idling stop function, the driver brings the vehicle stop maintaining function into operation, thus even if the driver moves his foot away from the brake pedal, the idling stop function would not be activated, and the engine will not be restarted. Thus, an OFF state of the brake pedal is excluded from the engine start conditions, and the engine will be restarted by an ON operation on an accelerator pedal.

In addition, the braking force by the vehicle stop maintaining function is generated by increasing the hydraulic pressure of wheel cylinders by means of a pump hydraulic pressure, and thus, when this function is in operation for a long time, there may occur a problem that a remaining capacity of a battery decreases. Thus, there is a technology in which the braking of the vehicle provided by using hydraulic pressure is switched to the braking of the vehicle provided by EPB (Electronic Parking Brake) in the case where the vehicle stop maintaining function has been in operation for a predetermined time, so as to avoid the vehicle stop maintaining function from being in operation for a long time (for example, refer to Japanese Patent Application Publication No. 2012-11969 (JP 2012-11969 A)).

However, with the braking force being provided by the parking brake, the vehicle may be moved when the engine is started by the idling stop function.

FIG. 1 is an exemplary diagram for illustrating the variation of the braking force with time. Since a predetermined time lapses while the vehicle stop maintaining function is in operation, at time t1, the vehicle stop maintaining function stops the braking provided by the hydraulic pressure, and starts the braking provided by the EPB. At time t1, the braking force provided by the EPB is increased, and the braking force provided by the hydraulic pressure is gradually decreased since time t1.

Therefore, for example, like at time t2 at which a long time has lapsed since the shifting into the EPB, the vehicle is stopped only by the braking force provided by the EPB. If the engine is started by the idling stop function in this state, according to the braking force of the EPB, the vehicle is likely to be moved by a driving force incurred by the speed-up of the engine and/or by a creeping after start.

In addition, the vehicle stop maintaining function releases the EP3 through an ON operation on the accelerator pedal, and the idling stop function starts the engine through an ON operation on the accelerator pedal. However, because the control on the braking force of the EPB has a slower responsiveness than the control on the braking force provided by the hydraulic pressure, the starting response may be degraded when the release of the EPB and the start of the engine are carried out simultaneously.

SUMMARY OF THE INVENTION

The present invention provides a control apparatus for a vehicle, which is capable of preventing the vehicle from being moved due to the start of the engine even if the braking unit for keeping stop of the vehicle has been switched.

According to the present invention, a control apparatus for a vehicle includes a stop-restart unit that stops an engine if an engine stop condition is satisfied and that restarts the engine if a restart condition is satisfied, and a first braking force control unit and a second braking force control unit that maintain a braking force for stopping the vehicle, characterized by an engine start unit that starts the engine in the case where a vehicle stop state achieved by the first braking force control unit is switched to a vehicle stop state achieved by the second braking force control unit while the engine has been stopped by the stop-restart unit.

It is possible to provide a control apparatus for a vehicle which is capable of preventing the vehicle from being moved due to the start of the engine even if the braking unit for keeping stop of the vehicle has been switched.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 7A and 7B are exemplary flowcharts for illustrating the operation sequence of the BH control part and the S&S control part (with EPB shifting);

FIGS. 8A to 8C are exemplary flowcharts for illustrating the operation sequence of the S&S control part (the second embodiment); and FIGS. 9A to 9C are exemplary flowcharts for illustrating the operation sequence of the S&S control part (the third embodiment).

DETAILED DESCRIPTION OF EMBODIMENTS

Hereinafter, modes for implementing the invention will be described with reference to the attached drawings.

Figure 2:
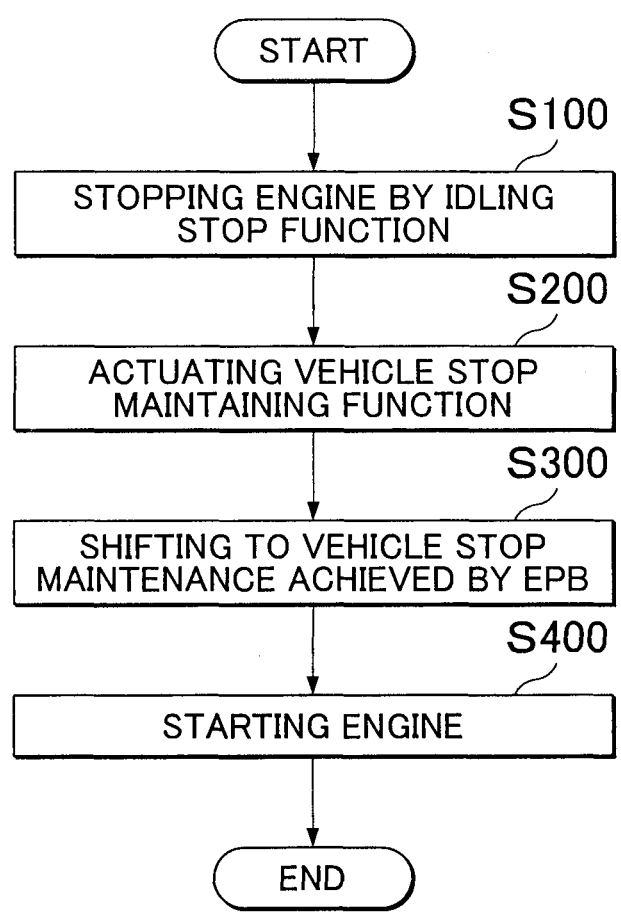
FIG. 2 is an exemplary flowchart for illustrating a schematic operation sequence of a control apparatus for a vehicle according to the present embodiment.

FIG. 2 is an exemplary flowchart for illustrating a schematic operation sequence of a control apparatus for a vehicle according to the present embodiment.

When the vehicle speed is slowed down so that an engine stop condition for the idling stop function is satisfied, the engine is stopped by the idling stop function (S100).

In addition, when the driver presses a brake pedal, the vehicle stop maintaining function is put into operation, and the vehicle stop maintaining function holds a wheel cylinder pressure for maintaining a vehicle stop state (S200). In the vehicle in which the idling stop function and the vehicle stop maintaining function are both in operation, even if the driver moves his foot away from the brake pedal, the idling stop function will not bring the engine into operation.

When a predetermined period has lapsed in such a state, the vehicle stop maintaining function switches a vehicle stop maintenance achieved by the wheel cylinder pressure to a vehicle stop maintenance achieved by an EPB (electronic parking brake) (S300). The idling stop function monitors whether or not the vehicle stop maintaining function has been shifted to the EPB, and detects the shifting into the EPB.

In the case of being shifted to the EPB, the idling stop function starts the engine (S400). That is, in addition to the engine start conditions of the idling stop function including an ON operation on an accelerator pedal and/or a decrease of a remaining capacity of a battery, a situation where the vehicle stop maintaining function has been shifted to the EPB is also used as a condition for starting the engine.

Figure 1:
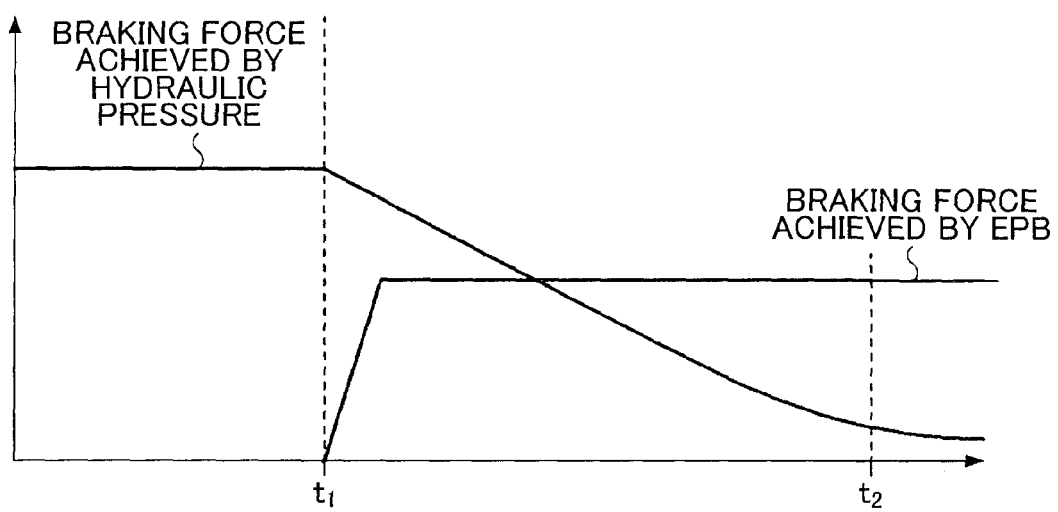
FIG. 1 is an exemplary diagram for illustrating the variation of the braking force with time.

As shown in FIG. 1, immediately after being shifted to the EPB, the wheel cylinder pressure is sufficient high, so that the vehicle is prevented from rushing out even if the engine is started immediately after the shifting into the EPB. In the vehicle carrying on both the idling stop function and the vehicle stop maintaining function, after the vehicle stop maintaining function brings the EPB into operation, the possibility of the vehicle being moved is reduced even if the idling stop function starts the engine.

In addition, the timing at which the engine is started may not necessarily be immediately after the shifting, as long as it is in a period in which a braking force not smaller than the braking force provided by the wheel cylinder pressure can be obtained. The braking force provided by the wheel cylinder pressure is guaranteed to be a value not smaller than the driving force incurred by the start of the engine. Therefore, it may be at the same time as the shifting from the vehicle stop maintenance by the wheel cylinder pressure to the vehicle stop maintenance by the EPB, or may be within a predetermined period after the shifting.

First Embodiment

Structural Example

Figure 3:
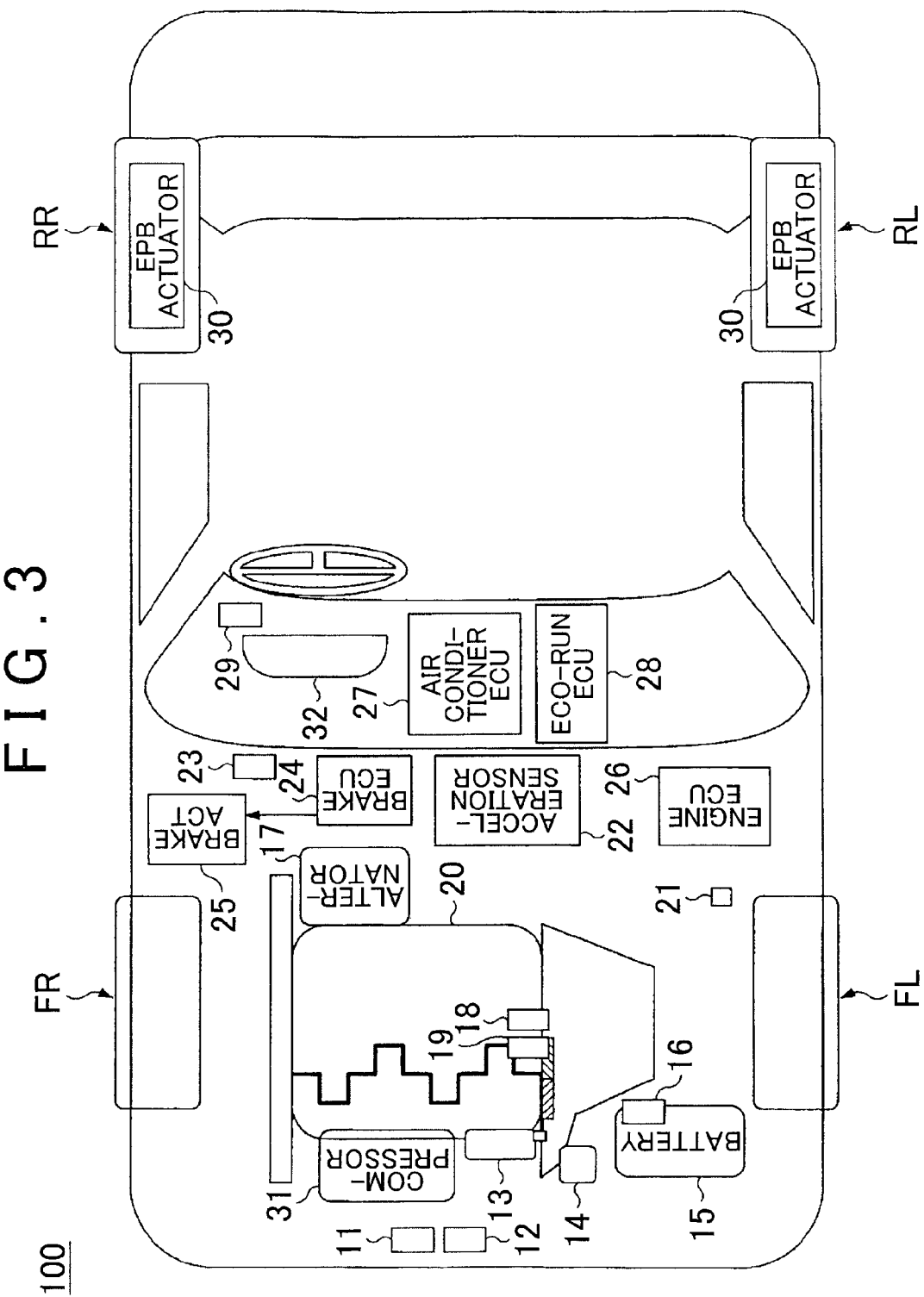
FIG. 3 is an exemplary block diagram for illustrating the units and functions of the control apparatus for a vehicle.

FIG. 3 is an exemplary block diagram of the units and function of the control apparatus 100 for a vehicle according to the present embodiment. These units and functions are not necessarily all used for the idling stop function or the vehicle stop maintaining function, and the configuration position and/or shape are only schematically shown. In addition, ECUs and/or sensors are communicatively connected via an on-board network such as CAN (Controller Area Network), or via dedicate lines.

The battery 15 is a power storage device (secondary battery) capable of charging and discharging. The battery 15 is, for example, a lead storage battery, which supplies power to an electric oil pump 14, a brake hydraulic pump (not shown), a tandem starter 13 and various ECUs (Electronic Control Units). In addition, the battery 15 is charged by the power generated by an alternator 17. The SOC of the battery 15 is monitored by a battery sensor 16.

The engine 20 is equipped with the electric oil pump 14, the tandem starter 13, a compressor 31 for an air conditioner, the alternator 17, a cam angle sensor 18, and a crank angle sensor 19. The tandem starter 13 is used to start the engine 20 by consuming the power from the battery 15. In the case where the engine rotation speed is high, the tandem starter 13 pushes out a pinion after bringing it into rotation so as to make it engage with a ring gear, such that the engine 20 can be started even during rotation of the engine. In addition, a starter without the function to rotate the pinion may also be equipped.

The alternator 17 is a power generator which generates electric power by being rotated in associated with the rotation of the crankshaft. A transmission belt is wound around the crankshaft and the rotation shaft of the alternator 17, and the alternator 17 is rotated by the power of the engine 20. The electric power generated by the alternator 17 is charged into the battery 15.

In addition, a transmission belt is wound around the compressor 31 of the air conditioner and the crankshaft, and the compressor 31 is rotated by the power of the engine 20.

The electric oil pump 14 is driven by the battery 15, and circulates the engine oil when the engine is stopped, whereby an uneven distribution of the engine oil during the stop of the engine is prevented, or the engine 20 is cooled during the stop of the engine.

The crank angle sensor 19 detects the crank angle, and the cam angle sensor 18 detects the cam angle. By identifying the crank angle and the cam angle, the so-called cylinder determination can be performed. For example, since the timing at which the respective cylinders reach the top-dead point is identified, the cylinder into which fuel is injected and combusted can be determined upon start of the engine. In addition, the crank angle sensor 19 is used to detect the engine rotation speed.

An engine hood lock SW 12 and a distance sensor 11 are provided in the front of the vehicle. The engine hood lock SW 12 is a sensor used to detect whether or not the engine hood is locked. When the engine hood is opened, the start of the engine is disabled by the idling stop function because the driver cannot observe the front.

The distance sensor 11 is, for example, a millimeter wave radar, a laser radar, a stereo camera, a TOF (Time of Flight) camera, or the like, and is a sensor used to detect the distance to an object. Besides the distance, relative speed and azimuth can also be obtained therefrom. An inter-vehicle distance control function enables a host vehicle to follow a preceding vehicle while maintaining the distance corresponding to the vehicle speed of the host vehicle.

The engine ECU 26 is an ECU for controlling the engine 20, and is connected with a tandem starter driving relay 21. When the engine ECU 26 energies the tandem starter driving relay 21, the tandem starter 13 operates to start the engine 20.

The brake ECU 24 controls a brake ACT 25 to control the wheel cylinder pressure at each wheel. The brake ACT 25 has an electric pump (not shown) for generating a hydraulic pressure, and has a pressure increasing valve, a pressure reducing valve and a pressure maintaining valve provided for each wheel. By controlling the opening degree of the pressure increasing valve, the pressure reducing valve or the pressure maintaining valve, the wheel cylinder pressure can be increased, reduced or maintained for each wheel. The brake ECU 24 performs the vehicle stop maintaining control by this function. In addition, a VSC (Vehicle Stability Control) control, an ABS control, a TRC control, and so on, can also be performed. Moreover, the VSC control is used to control the wheel cylinder pressure of the respective wheels in such a manner that unstable vehicle behaviors such as excessive under-steering or over-steering of the host vehicle are prevented. In addition, the brake ECU 24 and the brake ACT 25 may be configured to supply the hydraulic pressure accumulated in an accumulator or the like to the respective wheel cylinders according to the depression force on the brake pedal by the driver, so as to brake the respective wheels.

In addition, the brake ECU 24 controls an EPB actuator 30 so as to control ON/OFF of the parking brake.

The brake booster negative pressure sensor 23 is a sensor that detects a booster negative pressure generated by an intake air negative pressure of the engine 20. By using this negative pressure, the depression force on the brake pedal by the driver can be boosted, so that the brake pedal can be reliably depressed by the driver. If the booster negative pressure becomes larger (approach to atmospheric pressure), the idling stop function will start the engine 20 to reduce the booster negative pressure, so as to prepare for the driver's operation on the brake pedal.

The acceleration sensor 22 is a sensor that detects the acceleration in fore-aft direction or in right-left direction, and is used to calculate the inclination angle (slope) of the road surface on which the vehicle is stopped. The braking force for maintaining the vehicle stop state is corrected according to the slope.

The air conditioner ECU 27 performs the so-called air conditioning control that controls the temperature inside the cabin to a temperature set by the driver. In the case where the engine 20 is stopped by the idling stop function, since the compressor 31 of the air conditioner is stopped, the air conditioner is switched to an air blowing function. In addition, during the air conditioning control performed by the air conditioner ECU 27 while the difference between the set temperature and the target temperature is large, the idle-stop function does not stop the engine 20.

The ECO-run ECU 28 is an ECU that controls the idling stop function. In the ECO-run ECU 28, a function to boost the voltage of the battery is integrated. When the engine 20 is started by the idle-stop function, since the voltage of the battery is lowered by the driving of the tandem starter 13, the ECO-run ECU 28 boosts the voltage of the battery in order to ensure the required voltage for other auxiliaries (ECUs, in-cabin lights, and so on). In addition, a configuration in which the idling stop function is controlled by using various ECUs such as the engine ECU may also be conceived.

The ECO-run canceling SW 29 is a switch for canceling the idling stop function. If the driver operates the ECO-run canceling SW 29 to be ON, the idle-stop function is turned off.

In addition, various operation status of the vehicle stop maintaining function and the idling stop function and/or alarm messages can be displayed on a dashboard 32, and a warning light is turned on. In addition to the dashboard 32, alarm messages and/or alarm sound may also be output from a speaker.

Figure 4:
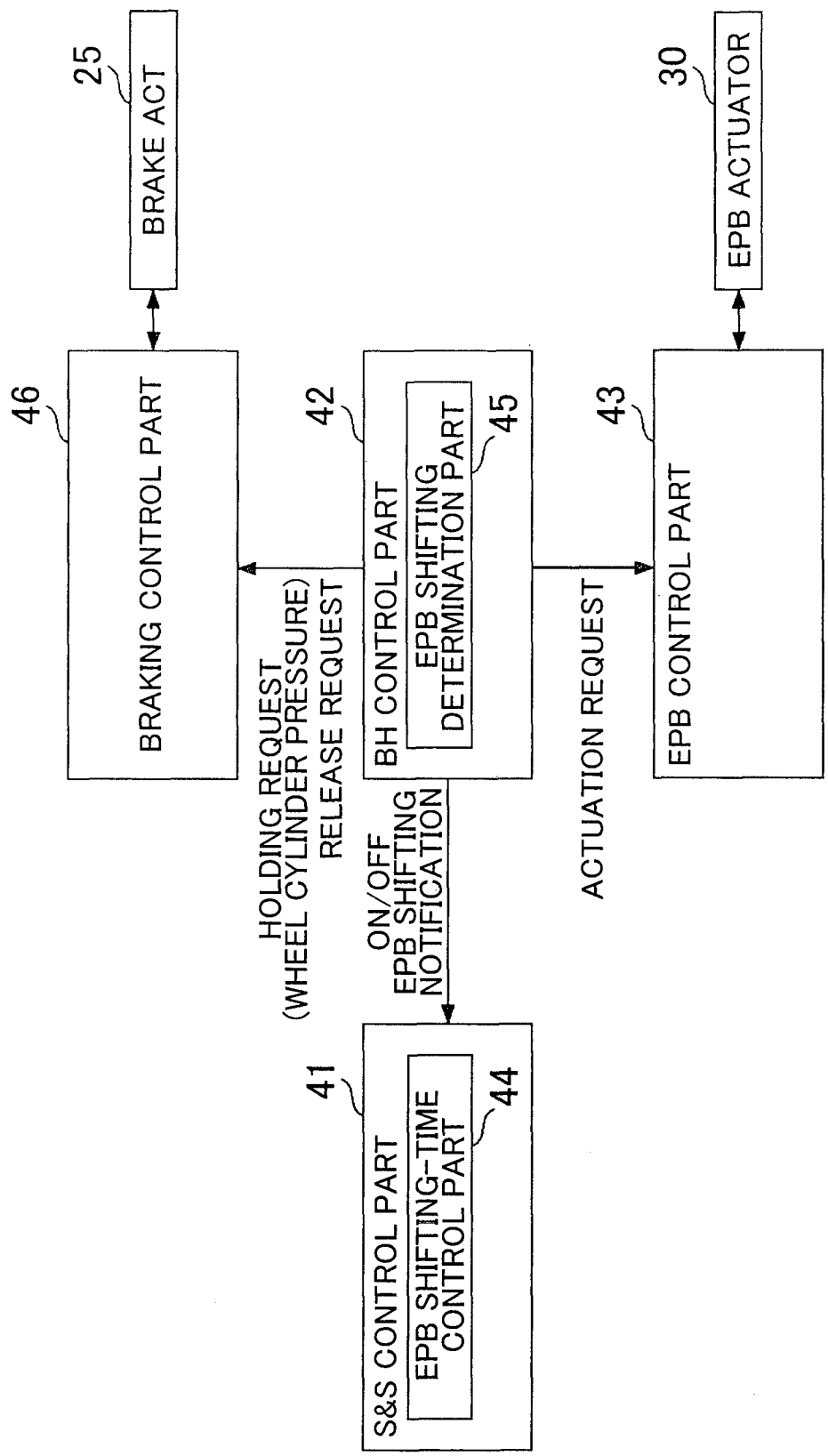
FIG. 4 is an exemplary functional block diagram of the control apparatus for a vehicle.

FIG. 4 shows an exemplary functional block diagram of the control apparatus for a vehicle. These functions can be implemented by executing the program stored in the ROM through the CPUs in the respective ECUs and cooperating with various hardwares.

The control apparatus 100 for a vehicle according to the present embodiment includes an S&S control part 41, a BH control part 42, an EPB control part 43 and a braking control part 46. The S&S control part 41 is a function mainly implemented by the ECO-run ECU 28. The BH control part 42, the EPB control part 43 and the braking control part 46 are functions mainly implemented by the brake ECU 24. However, in which ECU the respective functions are built can be suitably designed. In addition, all these function can be built in a single ECU. That is, it would be enough if these functions are included in the vehicle.

The S&S control part 41, the EPB control part 43, the BH control part 42 and the braking control part 46 are communicated with each other via the on-board network (CAN, FlexRay, LIN, Ethernet (registered trademark), etc.) by using ECUs, so as to transmit and receive various data. The S&S control part 41 obtains the information about the start (ON) of the vehicle stop maintaining function and the completion (OFF) of the vehicle stop maintaining function by the BH control part 42. In addition, the S&S control part 41 detects the shifting from the vehicle stop maintenance by the wheel cylinder pressure to the vehicle stop maintenance by the EPB (EPB shifting notification) by the BH control part 42.

The BH control part 42 determines whether or not a vehicle stop maintenance actuation operation is carried out while the vehicle is stopped, and accordingly starts the vehicle stop maintenance. To be specific, it is performed by outputting a holding request and a wheel cylinder pressure for vehicle stop maintenance to the braking control part 46. The braking control part 46 holds the wheel cylinder pressure by means of the brake ACT 25.

The BH control part 42 includes an EPB shifting determination part 45, which determines that the vehicle stop maintenance by the wheel cylinder pressure is shifted to the vehicle stop maintenance by the EPB when a predetermined period (e.g., several minutes) has lapsed since the start of the vehicle stop maintenance. The BH control part 42 sends an actuation request to the EPB control part 43 to actuate the EPB.

The EPB control part 43 controls the EPB actuator 30. The EPB actuator 30 is an actuator which will electrically actuate the parking brake even if the driver does not perform an operation to actuate the parking brake. As the EPB, there is drum-type brake, disc-type brake, and so on, and in the present embodiment, there is no limitation. In the case of the drum-type brake, by winding up a brake cable by means of a motor as the EPB actuator 30, a brake shoe is pressed on a brake drum. In the case of disc-type brake, a motor as the EPB actuator 30 presses brake pads against a brake disc.

In addition, after the BH control part 42 sends the actuation request to the EPB control part 43, the braking control part 46 is requested to release the vehicle stop maintenance, and the brake control part 46 terminates the vehicle stop maintenance by the brake ACT 25. By terminating the vehicle stop maintenance, the value of the wheel cylinder pressure is reduced compared with that in the vehicle stop maintenance state, as will be described later.

The S&S control part 41 determines whether or not an engine stop condition is satisfied, and stops the engine 20 when an affirmative determination is made. The S&S control part 41 also determines whether or not an engine start condition is satisfied in the case where the engine 20 is stopped, and starts the engine 20 when an affirmative determination is made. The engine stop condition includes such a condition that the vehicle speed is zero or is at or below a predetermined value, and such a condition that the brake pedal is depressed. However, as a stop disabling condition, there are conditions as follows: a condition that the air conditioner ECU prohibits the stop of the engine; a condition that the SOC of the battery 15 is at or below a threshold; a condition that the electrical load is at or above a threshold; a condition that the engine coolant temperature is at or below a threshold; a condition that the accelerator pedal is depressed; and so on.

The engine start condition varies depending on ON/OFF of the vehicle stop maintaining function. The engine start condition (in the case where the vehicle stop maintaining function is OFF) includes a situation where a changing from ON to OFF of the brake pedal is detected, a situation where the accelerator pedal is ON and the SOC of the battery 15 is lowered to a threshold or below, a situation where the brake booster negative pressure becomes a threshold or above. The engine start condition (in the case where the vehicle stop maintaining function is ON) includes the situation where the accelerator pedal is ON and the SOC of the battery 15 is lowered to a threshold or below and the situation where the brake booster negative pressure becomes a threshold or above. However, as a start disabling condition, there is a situation where the engine hood lock SW 12 is OFF, and so on. That is, in the case where the vehicle stop maintaining function is ON, in order that the engine 20 will not be operated by the idling stop function even if the driver moves his foot away from the brake pedal, the condition that a changing from ON to OFF of the brake pedal is detected is not be used as the engine start condition.

In addition, in the case where the vehicle stop maintenance by the wheel cylinder pressure is shifted to the vehicle stop maintenance by the EPB, the BH control part 42 determines that the vehicle stop maintaining function is turned OFF. Therefore, when shifting into the EPB, the condition that the changing from ON to OFF of the brake pedal is detected is reused as the engine start condition for the idling stop function.

In addition, the S&S control part 41 in the present embodiment includes an EPB shifting-time control part 44. In the case where the BH control part 42 has shifted to the vehicle stop maintenance by the EPB, the EPB shifting-time control part 44 performs an engine start determination based on the engine start condition (the vehicle stop maintaining function is OFF because of being shifted to the EPB), or instead of the engine start determination, determines whether or not a situation where the engine 20 is to be started occurs, and accordingly starts the engine.

The control illustrated in FIG. 2 is as follows: immediately after the BH control part 42 switches to the vehicle stop maintenance by the EPB, the vehicle will not be moved even if the engine 20 is started, so it is determined as being at a situation where the engine 20 is started, and the EPB shifting-time control part 44 starts the engine 20.

The situation where the engine 20 is started will be further described below. This situation is, for example, a situation where a braking force beyond the driving force incurred by the start of the engine is available.

[The Wheel Cylinder Pressure after the Termination of the Vehicle Stop Maintaining Function]

The wheel cylinder pressure after the termination of the vehicle stop maintaining function is reduced corresponding to the style of the BH control part 42, the construction of the brake ACT 25, and so on. However, immediately after the BH control part 42 switches to the vehicle stop maintenance by the EPB, a braking force beyond the driving force incurred by the start of the engine can be obtained.

Figure 5A:
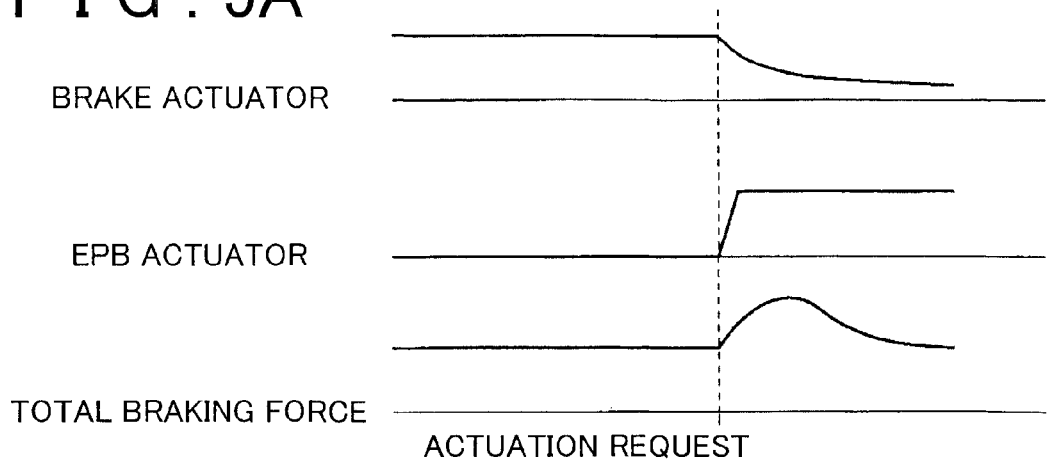
FIGS. 5A to 5C are exemplary diagrams for illustrating the transition of the total braking force provided by a brake ACT and an EPB actuator.
Figure 5B:
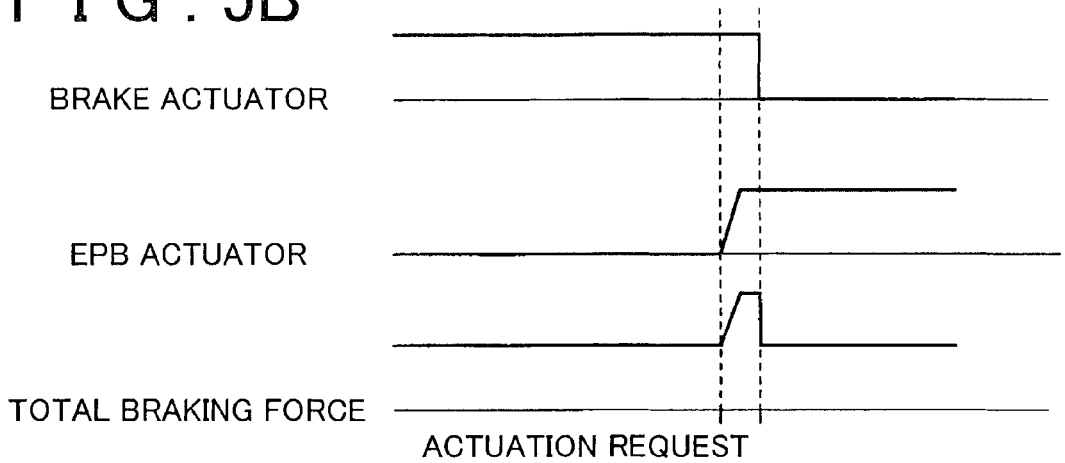
Figure 5C:
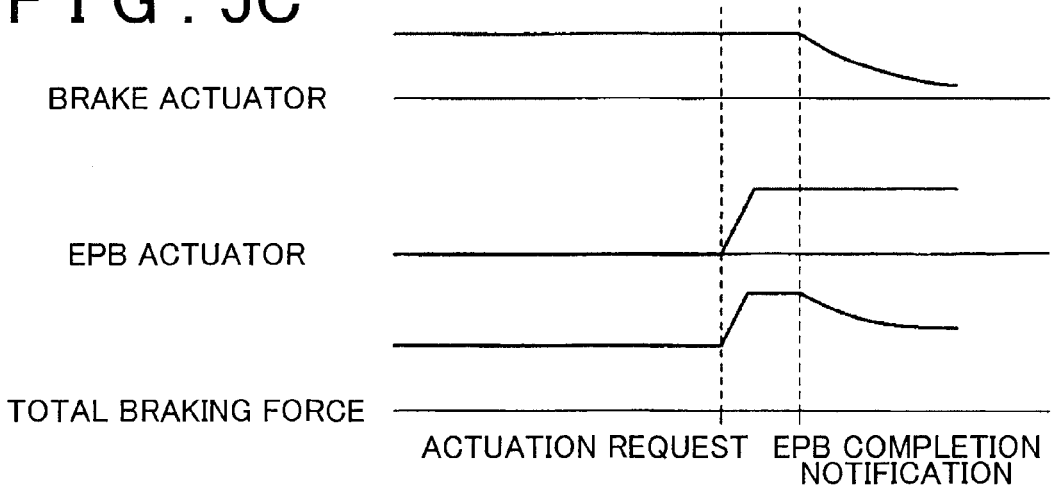

FIGS. 5A to 5C are exemplary diagrams for illustrating the transition of a total braking force of the brake ACT 25 and the EPB actuator 30.

In FIG. 5A, after the BH control part 42 sends the actuation request to the EPB control part 43, the vehicle stop maintenance by the brake ACT 25 is terminated. In FIG. 5A, the braking control part 46 does not perform a pressure increase by means of the electric pump of the brake ACT 25, but maintains the wheel cylinder pressure by the pressure maintaining valve. In this way, the wheel cylinder pressure is reduced gradually. The EPB control part 43 receives the actuation request and brings the EPB actuator 30 into operation, and a certain brake pressure is available in short time. Therefore, at least immediately after the actuation request, the total braking force of the brake ACT 25 and the EPB actuator 30 is larger than the braking force achieved only by the brake ACT 25.

In FIG. 5B, after the BH control part 42 sends the actuation request to the EPB control part 43, the BH control part 42 enables the braking control part 46 to terminate the braking performed by the brake ACT 25 after a predetermined period has lapsed. The braking control part 46 opens the pressure reducing valve, and the wheel cylinder pressure is dramatically reduced. However, because the braking performed by the brake ACT 25 is terminated after the predetermined period has lapsed since the EPB actuation request, at least immediately after the actuation request, the total braking force of the brake ACT 25 and the EPB actuator 30 is larger than the braking force achieved only by the brake ACT 25.

In FIG. 5C, after the BH control part 42 sends the actuation request to the EPB control part 43, the EPB control part 43 brings the EPB actuator 30 into operation. The EPB control part 43 notifies the BH control part 42 of an EPB completion notification, by which the BH control part 42 enables the braking control part 46 to terminate the braking for vehicle stop maintenance. In this case, the braking control part 46 may maintain the wheel cylinder pressure by means of the pressure maintaining valve, and may also dramatically reduce the wheel cylinder pressure by opening the pressure reducing valve. In either situation, at least immediately after the actuation request, the total braking force of the brake ACT 25 and the EPB actuator 30 is larger than the braking force achieved only by the brake ACT 25.

In addition, the braking force for the vehicle stop maintenance achieved by the wheel cylinder pressure is determined so that the vehicle will not be moved when the engine is started, and a required braking force can be surely guaranteed solely by the braking force for vehicle stop maintenance.

[About the Vehicle Stop Maintaining Function and the Idling Stop Function]

Figure 6A:
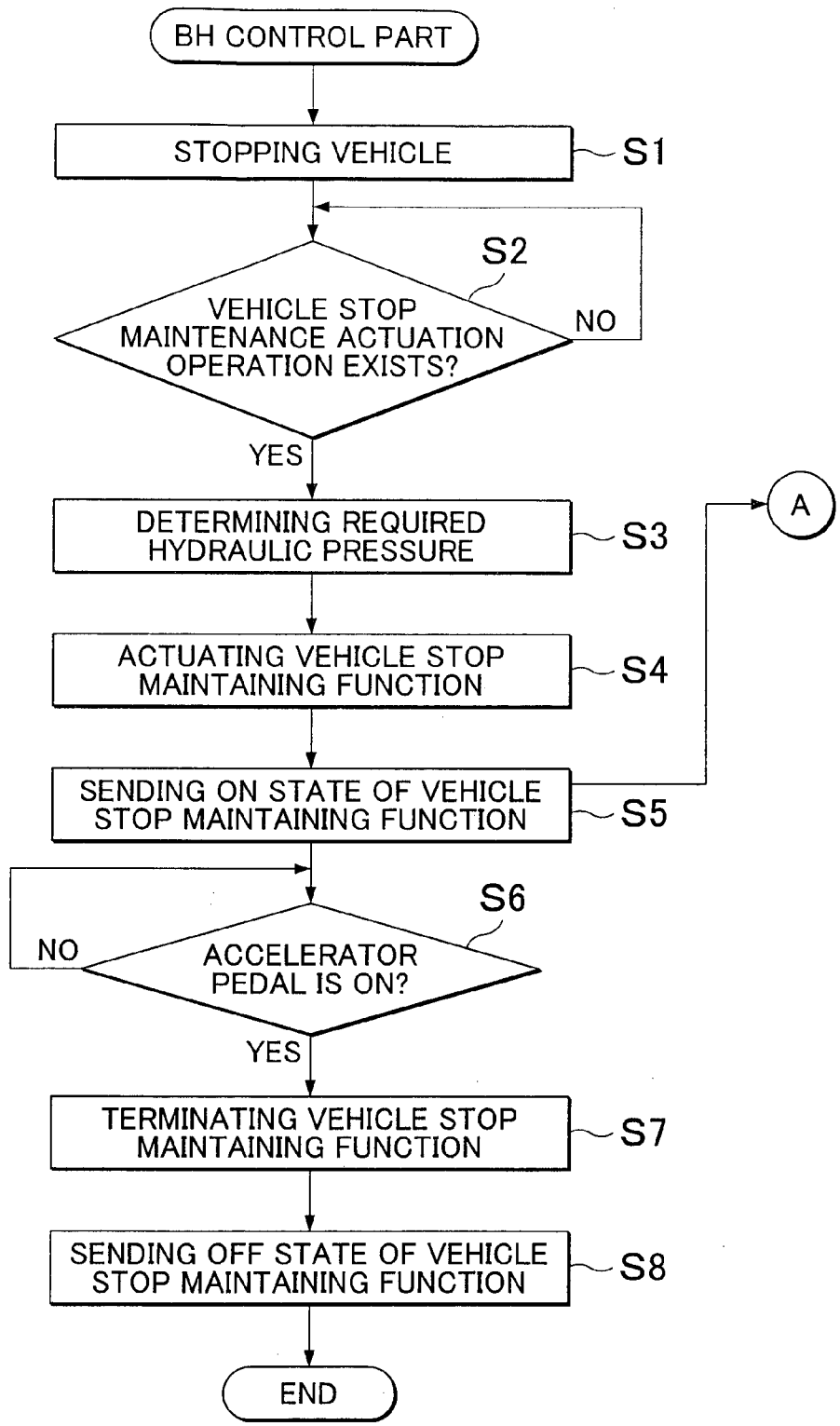
FIGS. 6A and 6B are exemplary flowcharts for illustrating the operation sequence of a BH control part and an S&S control part (without EPB shifting)
Figure 6B:
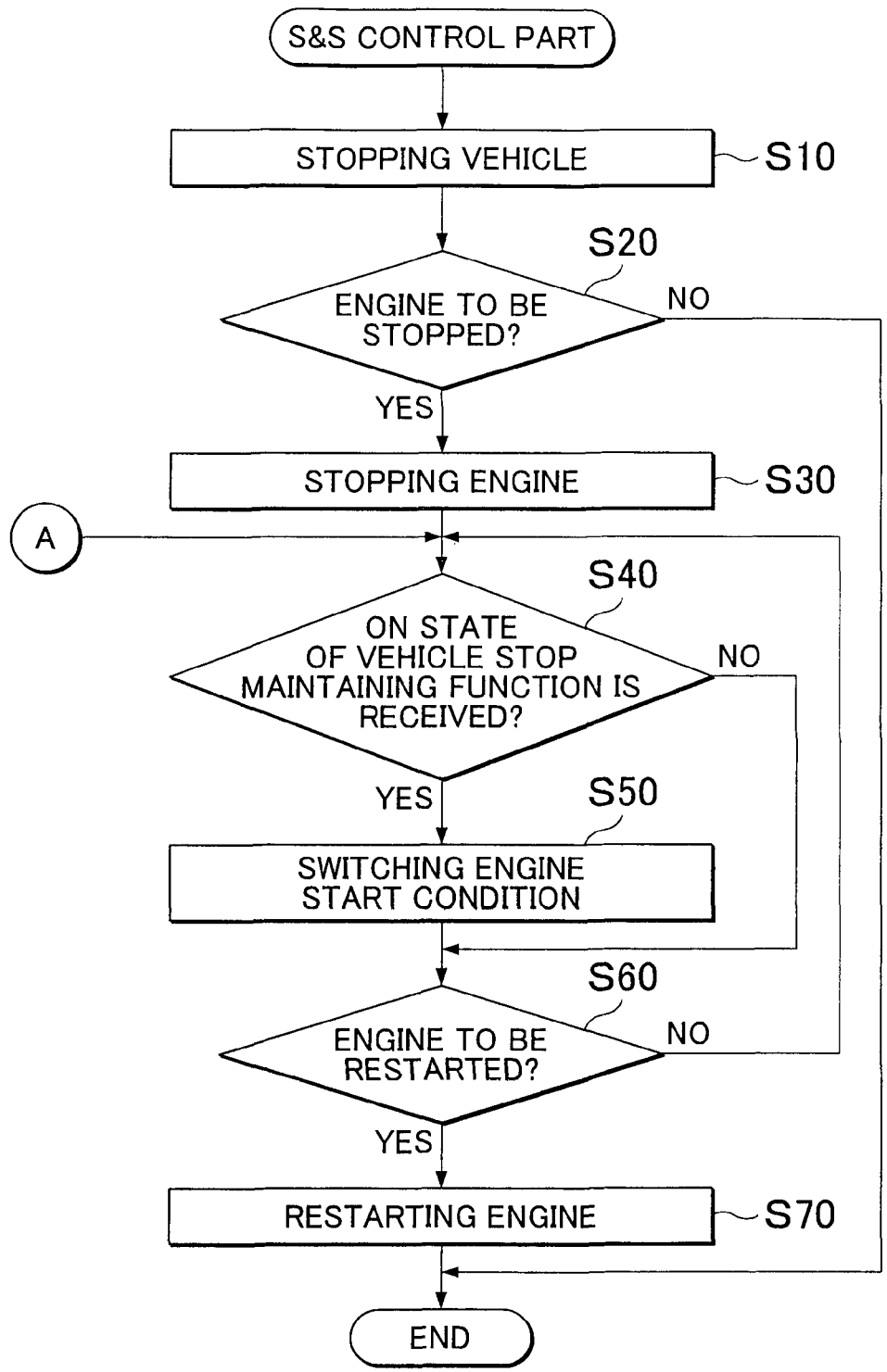

FIGS. 6A and 6B are exemplary flowcharts for illustrating the operation sequence of the BH control part 42 and the S&S control part 41. In FIGS. 6A and 6B, it is the operation sequence in the case where the EPB is not in operation and the engine 20 is started by the idling stop function, which is a conventional operation sequence.

During a traveling, the driver operates the brake pedal to stop the vehicle (S1).

When the vehicle is stopped (the vehicle speed becomes zero), the BH control part 42 determines whether or not there is a vehicle stop maintenance actuation operation (S2). The vehicle stop maintenance actuation operation is, for example, an operation by which the driver depresses the brake pedal with a depression force of a threshold or more. In addition, it may also be an operation of pressing a predetermined button. The BH control part 42 detects the value of the master cylinder pressure and/or the travel amount of the travel of the brake pedal to determine whether or not the vehicle stop maintenance actuation operation exists.

In the case where the vehicle stop maintenance actuation operation is detected (YES in S2), the BH control part 42 determines a required wheel cylinder pressure for vehicle stop maintenance (S3). When the vehicle is stopped with D range and the engine 20 is in idle state, it is preferred that a wheel cylinder pressure by which the vehicle will not be moved by the driving force incurred when the engine is started can be obtained. This wheel cylinder pressure is determined by the performance of the brake and/or the weight of the vehicle. In addition, it may be corrected according to the inclination angle of the road surface.

The BH control part 42 outputs the holding request to the braking control part 46 to obtain the determined wheel cylinder pressure (S4). The braking control part 46 maintains the braking force for vehicle stop maintenance by controlling the brake ACT 25. That is, the wheel cylinder pressure obtained by the driver's depression on the brake pedal while the vehicle is stopped is utilized, and is maintained as the wheel cylinder pressure determined for achieving the vehicle stop maintaining function. In the case where the wheel cylinder pressure generated by depressing the brake pedal is smaller than the determined wheel cylinder pressure, since a braking force for stopping the vehicle is obtained, this wheel cylinder pressure is maintained. This function of the BH control part 42 and the braking control part 46 is the vehicle stop maintaining function. Because the driver can move his foot away from the brake pedal while the engine 20 is kept in operation, the freedom degree of the driver's posture is improved upon short-time stopping.

In addition, when the vehicle stop maintaining function is in operation, once the engine stop condition is satisfied, the idling stop function will stop the engine.

The BH control part 42 sends the actuation of the vehicle stop maintaining function (the vehicle stop maintaining function is ON) to the S&S control part 41 (S5).

In addition, when the vehicle stop maintaining function is in operation, the BH control part 42 determines whether or not the accelerator pedal is operated (S6).

In the case where the accelerator pedal is operated (YES in S6), the BH control part 42 terminate the vehicle stop maintenance (S7). That is, in the case where the accelerator pedal is operated, the BH control part 42 outputs a release request to the braking control part 46. In addition, since the engine 20 is restarted by the idling stop function through the ON operation of the accelerator pedal, the vehicle resumes traveling promptly.

The BH control part 42 sends the termination of the vehicle stop maintenance (the vehicle stop maintaining function is OFF) to the S&S control part 41 (S8).

Next, the S&S control part 41 will be described. During a traveling, the driver operates the brake pedal to stop the vehicle (S10). In addition, the vehicle being stopped in terms of the idling stop function generally indicates that the vehicle speed is zero; however, even the vehicle speed is above zero, as long as it is not above a predetermined value, there still exists the idling stop function for stopping the engine 20. In the present embodiment, for the purpose of illustration "the vehicle speed becoming zero" is used to determine that the vehicle is stopped.

Next, the S&S control part 41 determines whether or not to the engine 20 is to be stopped based on the engine stop condition (S20). In addition, the situation where the stop disabling condition is not satisfied is regarded as a precondition.

In the case where the engine stop condition is satisfied (YES in S20), the S&S control part 41 requests the engine ECU to stop the engine, so that the engine ECU 26 stops the injection of fuel to stop the engine 20 (S30).

The S&S control part 41 determines whether or not the actuation of the vehicle stop maintaining function (the vehicle stop maintaining function is ON) has been received (S40).

In the case where the actuation of the vehicle stop maintaining function is received (YES in S40), the S&S control part 41 switches the engine start condition (S50). That is, the situation where the changing from ON to OFF of the brake pedal is detected is removed from the engine start conditions (the engine is started by the ON operation of the accelerator pedal). In the case where the actuation of the vehicle stop maintaining function is not received, the engine start condition remains as it is.

In the case where the engine 20 is stopped, the S&S control part 41 determines whether or not the engine 20 is to be restarted based on the engine start condition (S60). In addition, when the start disabling condition is satisfied, the engine 20 will not be started.

In the case where the engine start condition is satisfied and the start disabling condition is not satisfied, the S&S control part 41 restarts the engine 20 (S70). That is, since the S&S control part 41 requests the engine ECU 26 to restart the engine, the engine ECU 26 turns on the tandem starter driving relay 21 to restart the engine 20.

In this way, the driver can stop the engine 20 simply by stopping the vehicle, whereby it is possible to reduce the fuel consumption in the idle state and to improve the fuel economy.

[The Operation Sequence when the EPB is in Operation]

Figure 7A:
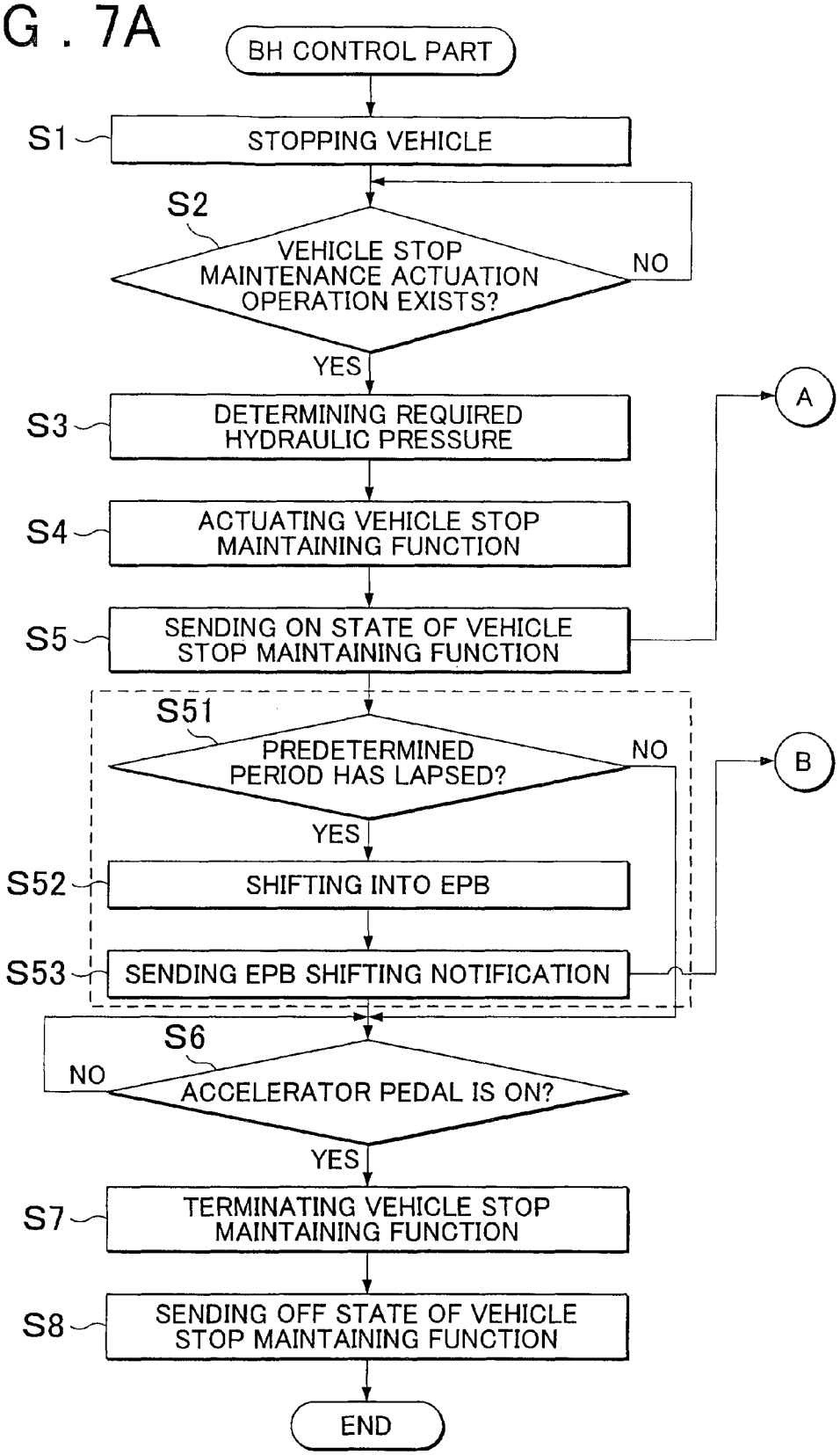

FIGS. 7A and 7B are exemplary flowcharts for illustrating an operation sequence of the BH control part 42 and the S&S control part 41. FIGS. 7A and 7B show the operation sequence in the case where the EPB is in operation. In the present flowcharts, the description focuses on the difference from FIGS. 6A and 6B.

The BH control part 42 starts to count time after actuating the vehicle stop maintaining function. Thus, the EPB shifting determination part 45 can determine whether or not a predetermined period has lapsed after the actuation of the vehicle stop maintaining function (S51). Until the predetermined period has lapsed, the operation sequence is identical to that in FIGS. 6A and 6B.

In the case where the predetermined period has lapsed (YES in S51), the BH control part 42 makes a shifting to EPB (S52). That is, the vehicle stop maintenance by the wheel cylinder pressure is shifted to the vehicle stop maintenance by the parking brake.

Then, the EPB shifting determination part 45 sends the EPB shifting notification to the S&S control part 41 (S53). Thus, the S&S control part 41 becomes able to perform a control suitable to the EPB shifting. In addition, the BH control part 42 sends the OFF of the vehicle stop maintaining function to the S&S control part 41, which may also be sent through the EPB shifting notification.

Next, the operation of the S&S control part 41 will be described. In the situation where the actuation of the vehicle stop maintenance is received in step S40, after the engine start conduction is switched in step S50, the S&S control part 41 determines whether or not the EPB shifting notification has been received (S501). Until the EPB shifting notification is received (NO in S501), it is determined whether or not the engine start condition in S60 is satisfied.

In the case where the EPB shifting notification is received (YES in S501), the EPB shifting-time control part 44 determines whether or not the brake pedal is sufficiently depressed (S502). A case where the brake pedal is sufficiently depressed mmns that a hydraulic pressure (a master cylinder pressure, a wheel cylinder pressure) to such an extent that the vehicle will not be moved by the driving force incurred when the engine is started can be obtained. Therefore, the determination may be made as follows: (i) whether the wheel cylinder pressure is at or above a threshold; (ii) whether the master cylinder pressure is at or above a threshold; (iii) whether the travel amount of the brake pedal is at or above a threshold; (iv) whether the depression force on the brake pedal is at or above a threshold. For example, in the case where the determination is made based on the wheel cylinder pressure, the required wheel cylinder pressure may be calculated by the following equations:

$$P[N] = \text{capacity coefficient of torque converter} * \text{torque} \quad (1)$$
$$\text{ratio of torque converter} * \text{1st gear ratio} * \text{differential}$$
$$\text{ratio/diameter of tire} * (\text{speed-up MAX rotation speed}^2)$$

$$\text{necessary hydraulic pressure [MPa]} = \quad (2)$$
$$\frac{P/\text{area of caliper piston [mm}^2] / BEF \text{ [dimension less]}}{\text{effective radium of caliper braking [mm]} *}$$
$$\text{dynamic load radius of tire [mm]}$$

According to the equation (1), the maximum torque P incurred when the engine 20 is speeded up is calculated. According to the equation (2), the wheel cylinder pressure for generating a braking force to balance the maximum torque P is calculated.

The above described thresholds can be preset, or can be determined dynamically. In the case of being dynamically determined, a standard wheel cylinder pressure is calculated by the equations (1) and (2), or a preset standard value is corrected according to the inclination of the road or the like.

In addition, in the case where the parking brake is tightened by the operation of the driver, instead of determining the depression amount of the brake pedal, whether or not the tension of the parking brake is at or above a threshold may be determined.

In the case where the brake pedal is not sufficiently depressed (NO in S502), the EPB shifting-time control part 44 starts the engine 20 (S510). That is, immediately after the BH control part 42 makes the shifting to the EPB, the braking force achieved by the brake ACT 25 becomes the largest value, so in the case where the driver does not depress the brake pedal immediately after the shifting into the EPB, the engine 20 is immediately started. Therefore, the vehicle is substantially prevented from being moved when the engine is started.

Although the determination in S502 is performed, since it takes a short time to make such a determination, the timing at which the engine is started may be regarded as being at the same time as the receipt of the EPB shifting notification, immediately after the receipt, or within a predetermined time after the receipt.

In the case where the brake pedal is sufficiently depressed (YES in S502), the EPB shifting-time control part 44 switches the engine start condition again (S503). That is, the vehicle stop maintaining function is turned off due to the shifting into the EPB, so the engine start condition for the ON state of the vehicle stop maintaining function is switched to the engine start condition for the OFF state of the vehicle stop maintaining function. Thus, in the case where the vehicle is kept stopped by the EPB, the engine 20 can be started by a changing from ON to OFF of the brake pedal, rather than by the ON operation on the accelerator pedal, whereby it is possible to suppress the situation in which the starting response is degraded even when the vehicle stop maintaining function releases the EPB by an ON operation on the accelerator pedal.

Therefore, if it is determined in step S502 that the brake pedal is sufficiently depressed, it is possible to prolong the stop time of the engine, and to improve the fuel economy.

The S&S control part 41 continues the idling stop function with the switched engine start condition (S504). That is, since the brake pedal is sufficiently depressed, a braking force by which the vehicle will not be moved even when the engine 20 is started is guaranteed; nevertheless, when the driver moves his foot away from the brake pedal, the engine 20 can be started. Therefore, the engine 20 can be started in the period during which there is a residual wheel cylinder pressure.

As described above, immediately after the power source for the vehicle stop maintenance is shifted from the hydraulic pressure to the EPB, since the braking force from both the vehicle stop maintaining function and the EPB is obtained, by starting the engine 20 immediately after the shifting, the engine can be started without moving the vehicle.

In addition, in the case where the vehicle stop maintenance by the wheel cylinder pressure is shifted to the vehicle stop maintenance by the EPB, the engine 20 is started immediately after the shifting, or the engine 20 is started by the OFF operation of the brake pedal, therefore, when the driver presses the accelerator pedal, the engine 20 has been started. Thus, it is possible to suppress the situation in which the starting response is degraded even when the vehicle stop maintaining function is released by an ON operation on the accelerator pedal (even when the EPB is released).

Second Embodiment

In the control apparatus 100 for a vehicle of the first embodiment, in the case where the driver does not sufficiently depress the brake pedal, the engine 20 is started. Hereinafter, in the present embodiment, the control apparatus 100 for a vehicle which starts the engine 20 based on the actual total braking force of the brake ACT 25 and the EPB actuator 30 in the case where the driver does not sufficiently depress the brake pedal will be described. The moving of the vehicle when the engine 20 is started can be more reliably prevented as compared with the first embodiment.

In the present embodiment, the block views shown in FIG. 3 and FIG. 4 will have the same function in the present embodiment, thus only the main constitution element of the present embodiment will be mainly described.

Figure 8A:
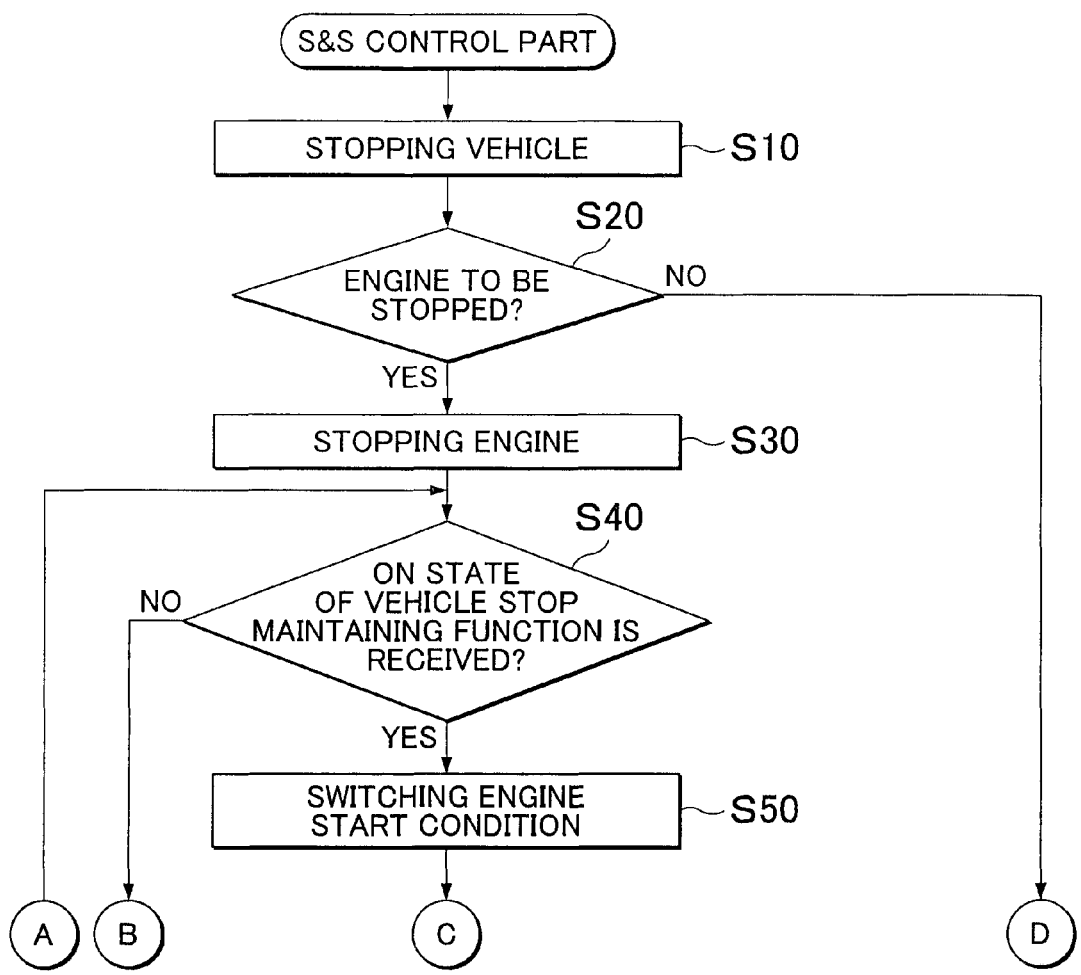
Figure 8C:
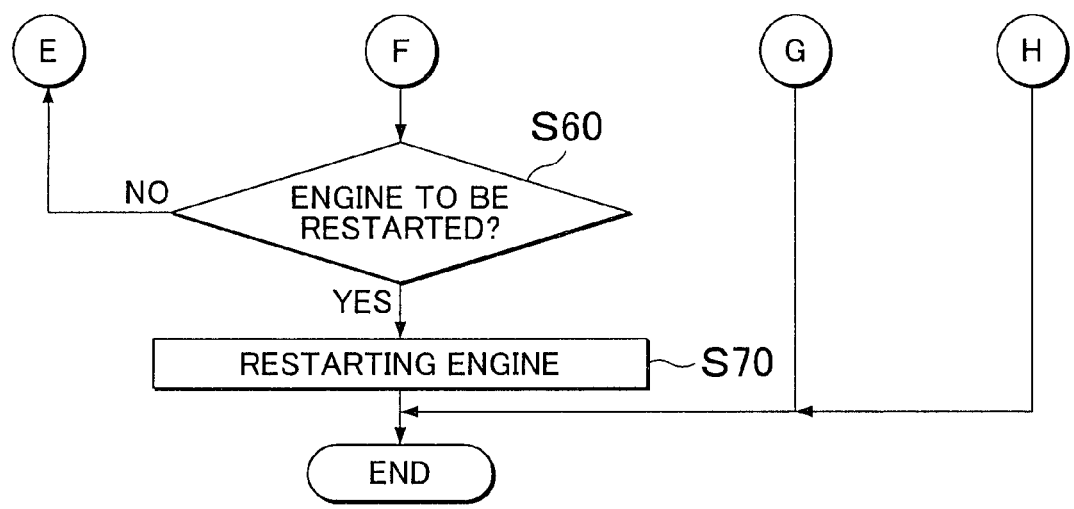

FIGS. 8A to 8C are exemplary flowcharts for illustrating an operation sequence of the S&S control part 41. The operation sequence of the BH control part 42 is the same as that in FIGS. 7A and 7B of the first embodiment. In the present flowchart, the description focuses on the difference from FIGS. 6A and 6B.

In the case where the brake pedal is not sufficiently depressed after the EPB shifting notification has been received (NO in S502), the EPB shifting-time control part 44 of the present embodiment determines whether or not the total braking force of the brake ACT 25 and the EPB actuator 30 is above or at the MAX torque incurred when the engine is started (S505). The MAX torque P incurred when the engine is started can be calculated by the above equation (1). The braking force achieved by the brake ACT 25 can be calculated according to the master cylinder pressure or the wheel cylinder pressure, and can be converted to a balanced driving torque by mapping, and so on. In the case where the EPB is a drum type brake, the braking force is related with the tension of the brake cable; however, the tension can be converted to a balanced driving torque by mapping, and so on. In the case where the EPB is a disc-type brake, the pressing force acting on the brake pad by a motor can be detected by a pressure sensor or the like, and the pressing force can be converted to a balanced driving torque by mapping and so on. Therefore, the sum of the converted driving torques is simply compared with the MAX torque P.

In the case where the total braking force of the brake ACT 25 and the EPB actuator 30 is above or at the MAX torque (YES in S505), the EPB shifting-time control part 44 starts the engine 20 (S510).

That is, in the case where the driver does not sufficiently dedepress the brake pedal, after confirming that the total braking force of the brake ACT 25 and the EPB actuator 30 is above or at the MAX torque incurred when the engine is started, the engine 20 can be started. Therefore, the moving of the vehicle when the engine 20 is started can be more reliably prevented as compared with the first embodiment.

In addition, in the case where the total braking force of the brake ACT 25 and the EPB actuator 30 is below the MAX torque incurred when the engine is started (NO in S505), the EPB shifting-time control part 44 determines whether or not a predetermined period has lapsed since the shifting into the EPB (S506). The predetermined period is determined according to the consuming power required for stopping the engine 20 by the S&S control part, the remaining capacity of the battery, and so on. That is, the engine 20 is started after the predetermined period has lapsed, so as to prevent applying load on the battery.

In addition, as explained in the first embodiment, in fact, the determination in S505 is YES, so it may be considered that there hardly is a situation where the engine 20 is started due to a lapse of the predetermined period. Thus, even when the determination in S506 is YES, the vehicle is less likely to be moved.

Therefore, according to the present embodiment, the engine 20 can be restarted after confirming that there is a sufficient braking force in the case where the driver does not sufficiently depress the brake pedal.

In the present embodiment, a control apparatus 100 for a vehicle which pressurizes the EPB in the case where the driver does not sufficiently depress the brake pedal and there is not sufficient braking force in the second embodiment.

Figure 9A:
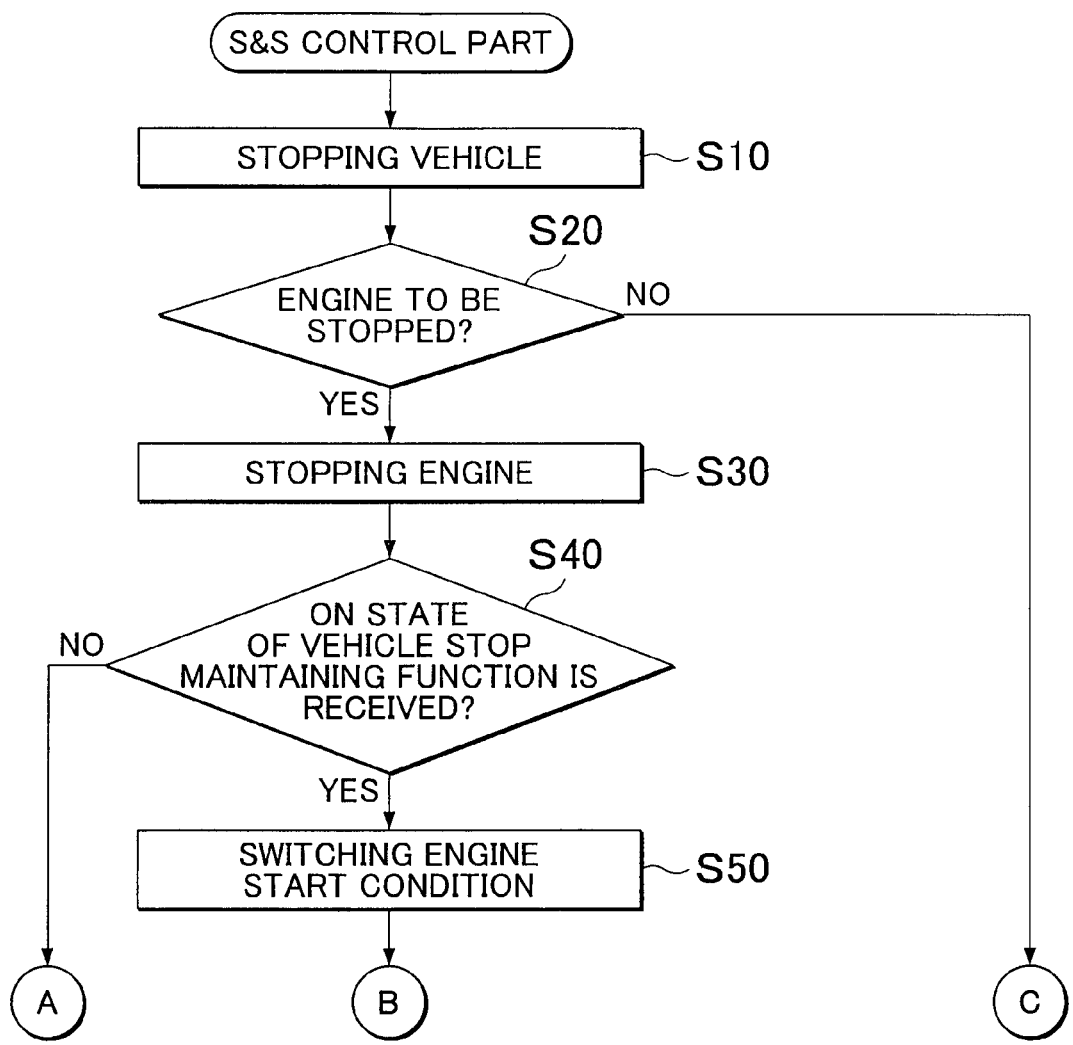
Figure 9C:
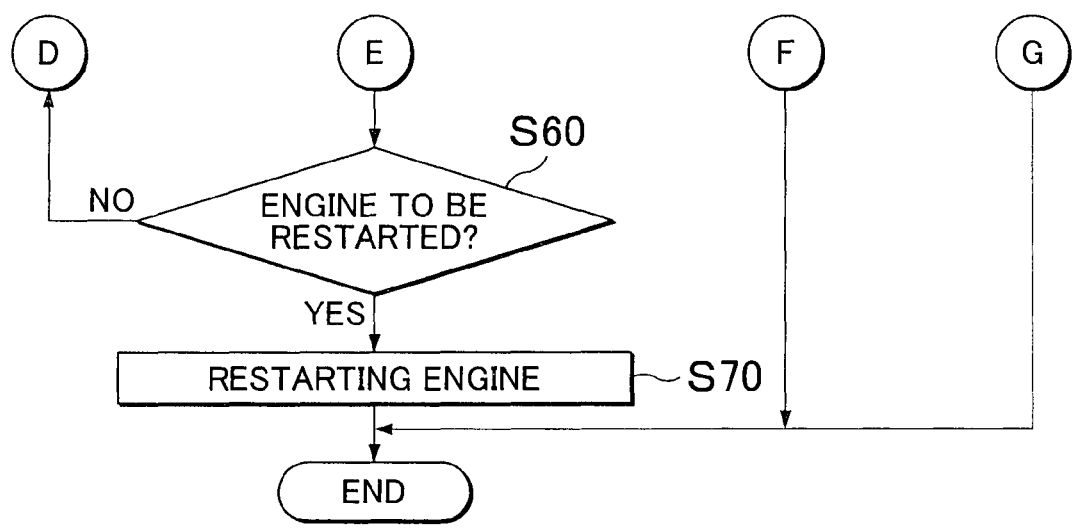

FIGS. 9A to 9C are exemplary flowcharts for illustrating an operation sequence of the S&S control part 41. The operation sequence of the BH control part 42 is the same as that in FIGS. 7A and 7B of the first embodiment. In the present flowchart, the description focuses on the difference from FIGS. 8A to 8C.

In the present embodiment, in the case where it is determined in step S505 that the total braking force is below the MAX torque incurred when the engine is started (NO in S505), the EPB shifting-time control part 44 requests the EPB control part 43 to increase the pressure of the EPB (S507). The EPB shifting-time control part 44 may also request the BH control part 42 to increase the braking force achieved by the EPB. By pressurizing the EPB, the braking force which is not sufficient with respect to the MAX torque incurred when the engine is started can be complemented. Thus, in the case where the total braking force of the brake ACT 25 and the EPB actuator 30 is insufficient due to certain reasons, the moving of the vehicle when the engine 20 is started can also be suppressed.

Modes for carrying out the invention have been described above by way of embodiments thereof, however, the invention is in no way limited to these embodiments, and various modifications and substitutions can be made without departing from the scope of the gist of the invention.

For example, although in the above illustrated embodiments, the vehicle having an engine as a power source has been described by way of example, the present invention can also be applied to a vehicle in which an electric motor is used as a power source in additional to the engine.

In addition, the engine start condition and the engine stop condition for the S&S control part or the vehicle stop maintenance actuation operation of the BH control part can be suitably set, and thus should not be limited to the situations as listed in the above embodiments.

In addition, although in the above illustrated embodiments, the braking force for the vehicle stop maintaining function is controlled by the hydraulic pressure, in a vehicle that uses an electric brake to control the braking force, the braking force for the vehicle stop maintaining function can also be generated by the electric brake. In addition, in such a vehicle, a part of the braking force may be provided by the electric brake.

What is claimed is:

1. A control apparatus for a vehicle, comprising:
    a stop-restart unit that stops an engine if an engine stop condition is satisfied and that restarts the engine if a restart condition is satisfied;
    a first braking force control unit and a second braking force control unit that control a braking force for maintaining a state in which the vehicle is stopped; and
    an engine start unit that starts the engine in the case where a vehicle stop state achieved by the first braking force control unit is switched to a vehicle stop state achieved by the second braking force control unit while the engine is stopped by the stop-restart unit.

2. The control apparatus for a vehicle according to claim 1, wherein
    the engine start unit starts the engine in the case where the vehicle stop state achieved by the first braking force control unit is switched to the vehicle stop state achieved by the second braking force control unit and an operation amount of a brake operating member is less than a first threshold.

3. The control apparatus for a vehicle according to claim 1, wherein
    the engine start unit starts the engine in the case where the vehicle stop state achieved by the first braking force control unit is switched to the vehicle stop state achieved by the second braking force control unit, an operation amount of a brake operating member is less than a first threshold, and a total braking force of the first braking force control unit and the second braking force control unit is at or above a second threshold.

4. The control apparatus for a vehicle according to claim 1, wherein in the case where the vehicle stop state achieved by the first braking force control unit is switched to the vehicle stop state achieved by the second braking force control unit, an operation amount of a brake operating member is less than a first threshold, and a total braking force of the first braking force control unit and the second braking force control unit is below a second threshold, the second braking force control unit increases the braking force, and the engine start unit starts the engine after the braking force has been increased by the second braking force control unit.

5. The control apparatus for a vehicle according to claim 1, wherein the first braking force control unit is a unit that keeps a hydraulic pressure obtained by a driver's operation on a brake operating member at or above a predetermined value, and the second braking force control unit is a unit that maintains a braking force by using a parking brake.

6. A control method of a control apparatus for a vehicle including a stop-restart unit that stops an engine if an engine stop condition is satisfied and that restarts the engine if a restart condition is satisfied, and a first braking force control unit and a second braking force control unit that maintain a braking force for stopping the vehicle, said control method comprising:

starting the engine by an engine start unit, in the case where a vehicle stop state achieved by the first braking force control unit is switched to a vehicle stop state achieved by the second braking force control unit while the engine is stopped by the stop-restart unit.

7. A control apparatus for a vehicle, the control apparatus being configured to operate as:

a stop-restart unit that stops an engine if an engine stop condition is satisfied and that restarts the engine if a restart condition is satisfied;

a first braking force control unit and a second braking force control unit that control a braking force for maintaining a state in which the vehicle is stopped; and an engine start unit configured to detect:
(a) a state of the first braking force control unit,
(b) a state of the second braking force control unit, and
(c) a state of the stop-restart unit,
and the engine start unit is configured to start the engine as a result of determining that:
(i) the stop-restart unit has stopped the engine, and
(ii) a vehicle stop state achieved by the first braking force control unit is switched to a vehicle stop state achieved by the second braking force control unit.

* * * * *